(12) United States Patent
VanValkenburgh

(10) Patent No.: US 12,485,984 B2
(45) Date of Patent: Dec. 2, 2025

(54) REVERSIBLE HANDLE EXTENSION FOR MOTORCYCLE STAND

(71) Applicant: Pit Bull Products, Inc., Huntsville, AL (US)

(72) Inventor: Charles VanValkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 469 days.

(21) Appl. No.: 18/170,013

(22) Filed: Feb. 16, 2023

(65) Prior Publication Data
US 2024/0278862 A1  Aug. 22, 2024

(51) Int. Cl.
*B62H 3/10* (2006.01)
*B66F 7/06* (2006.01)

(52) U.S. Cl.
CPC .............. *B62H 3/10* (2013.01); *B66F 7/0641* (2013.01)

(58) Field of Classification Search
CPC ................................ B62H 3/10; B66F 7/0641
See application file for complete search history.

(56) References Cited

U.S. PATENT DOCUMENTS

| | | | |
|---|---|---|---|
| 6,056,272 A * | 5/2000 | Sayler | B66F 15/00 254/131 |
| 6,341,763 B1 * | 1/2002 | Lefebvre | B66F 15/00 254/131 |
| 6,488,157 B2 * | 12/2002 | Chen | B66F 3/005 211/20 |
| 6,581,784 B1 * | 6/2003 | Pino | B66F 15/00 254/131 |
| 6,802,493 B2 * | 10/2004 | Lance | B66F 3/005 254/8 B |
| 8,360,252 B1 * | 1/2013 | Fagan | B62H 3/10 211/21 |
| 8,517,401 B1 * | 8/2013 | Horn | B62B 5/0089 280/47.15 |
| 9,045,184 B2 * | 6/2015 | Van Valkenburgh | B62H 3/10 |
| 2003/0141493 A1 * | 7/2003 | Siivonen | B25H 1/0014 254/131 |
| 2004/0099851 A1 * | 5/2004 | Carnahan | B66F 15/00 254/131 |
| 2007/0096069 A1 * | 5/2007 | Kobacker | B62H 3/10 254/131 |
| 2022/0379984 A1 * | 12/2022 | VanValkenburgh | B66F 5/02 |

* cited by examiner

*Primary Examiner* — Seahee Hong
(74) *Attorney, Agent, or Firm* — Adam K. Sacharoff; Much Shelist, P.C.

(57) ABSTRACT

The invention is an extension of a reversible motorcycle stand handle for the purpose of additional leverage that is itself reversible to accommodate various positions of the motorcycle stand handle. It is tailored specifically to work with a single-sided swingarm stand, known as the One-Armed Rear Stand. It addresses the unique geometry of that stand but can be used in other similar applications. It adds additional leverage to allow smaller/lighter persons to lift larger/heavier motorcycles with greater ease. It incorporates an angle such that the user's hand and fingers do not contact the ground regardless of whether it is configured for the handle to face forward or rearward with respect to the motorcycle. It incorporates a spring-loaded pin lock to allow it to be reversed 180 degrees or be removed from the motorcycle stand handle.

8 Claims, 8 Drawing Sheets

REVERSIBLE HANDLE EXTENSION FOR MOTORCYCLE STAND

BACKGROUND OF THE INVENTION

The present invention relates generally to motorcycle stands.

More particularly, this invention pertains to an extension of a motorcycle stand to increase leverage to allow the motorcycle wheel to be lifted off the ground with greater ease. The primary usage is on a One Armed Rear Stand. The stand itself is a standalone apparatus for lifting the rear wheel off the ground for maintenance such as wheel removal, wheel cleaning, chain adjusting and chain cleaning. The stand provides ample leverage for lifting the bike in most cases, but for heavier motorcycles and/or lighter users, it can be challenging to lift the bike without some augmentation. Due to the unique angle of the motorcycle stand handle and the fact that it is reversible in that the handle can be used in a forward facing or rear facing orientation, a unique invention was required.

BRIEF SUMMARY OF THE INVENTION

The present invention is a handle extension that can be easily added or removed from the motorcycle stand handle regardless of whether the handle is facing forward or rearward. The handle extension contains a spring-loaded shouldered locking pin that locks into one of the corresponding holes adjacent the end of the handle. As part of the invention, the motorcycle stand handle itself is configured specifically for reception of the invention and is therefore part of the invention. The holes near the end of the handle are situated 180 degrees apart to accommodate the handle extension in either the forward or rearward direction. If the user chooses not to use the handle extension, a handle end cap can be installed onto the motorcycle stand handle to protect the tip of the handle and finish the stand cosmetically.

DETAILED DESCRIPTION OF THE INVENTION

Figure 1:
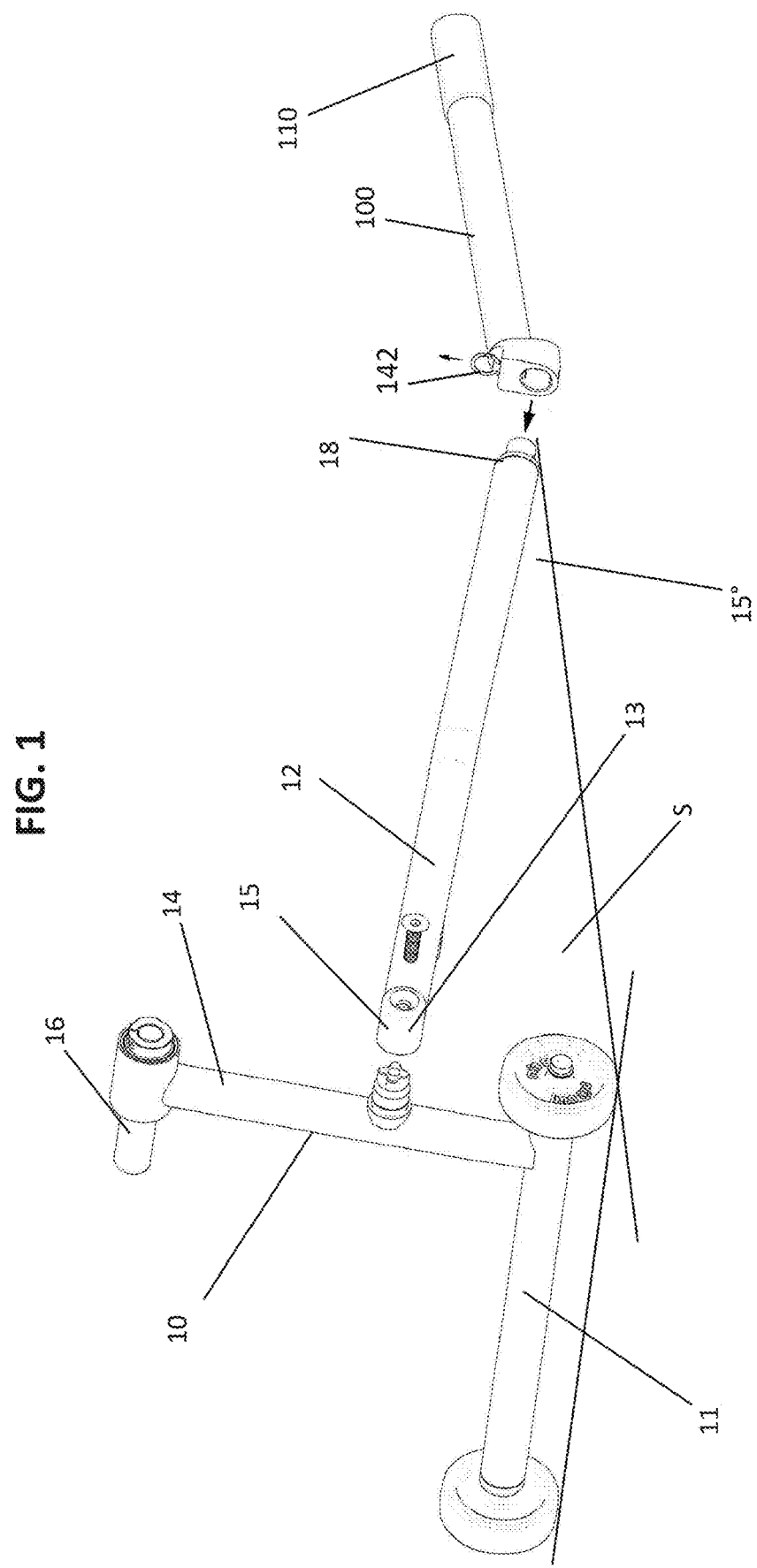
FIG. 1 Illustrates the invention in exploded view showing the shouldered locking pin, spring, and pull ring as installed into the housing cavity and shows how the invention installs onto the motorcycle stand handle.
Figure 2:
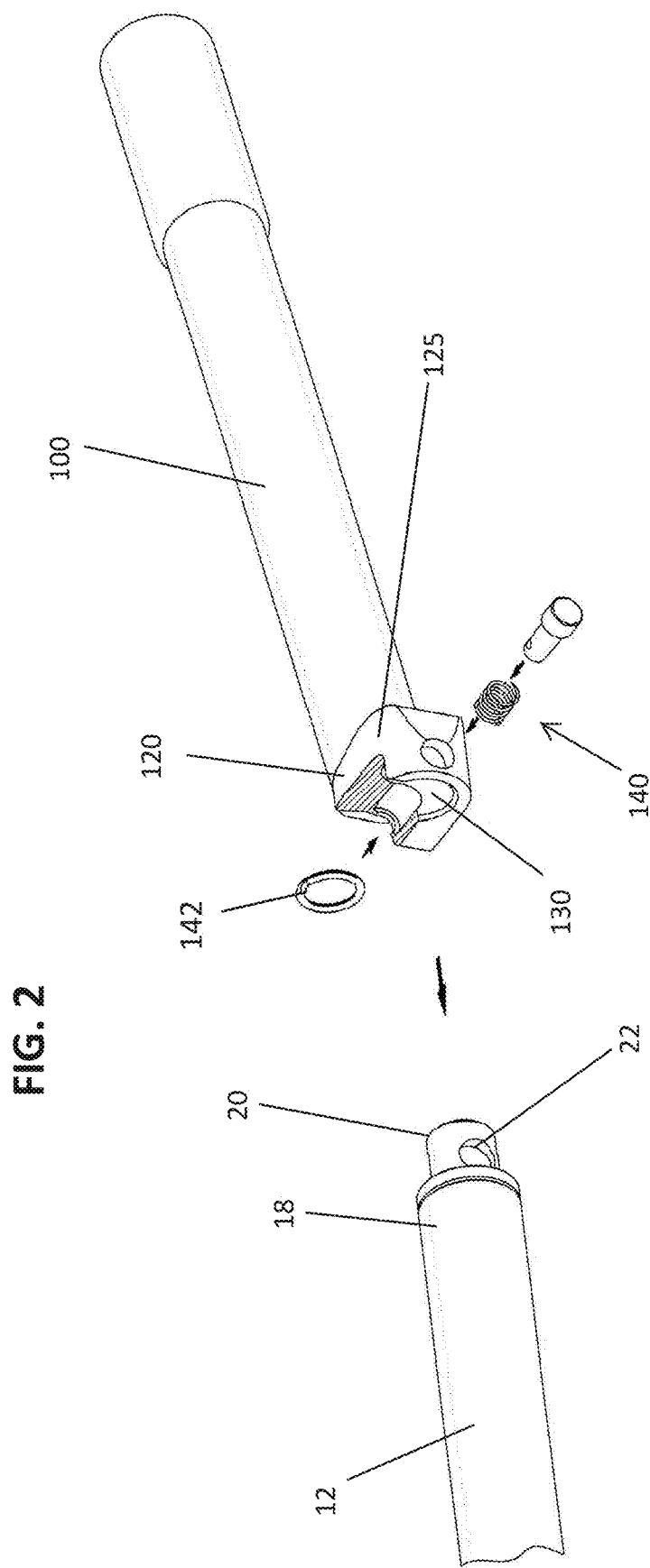
FIG. 2 Is an enlarged exploded view of FIG. 1.
Figure 3:
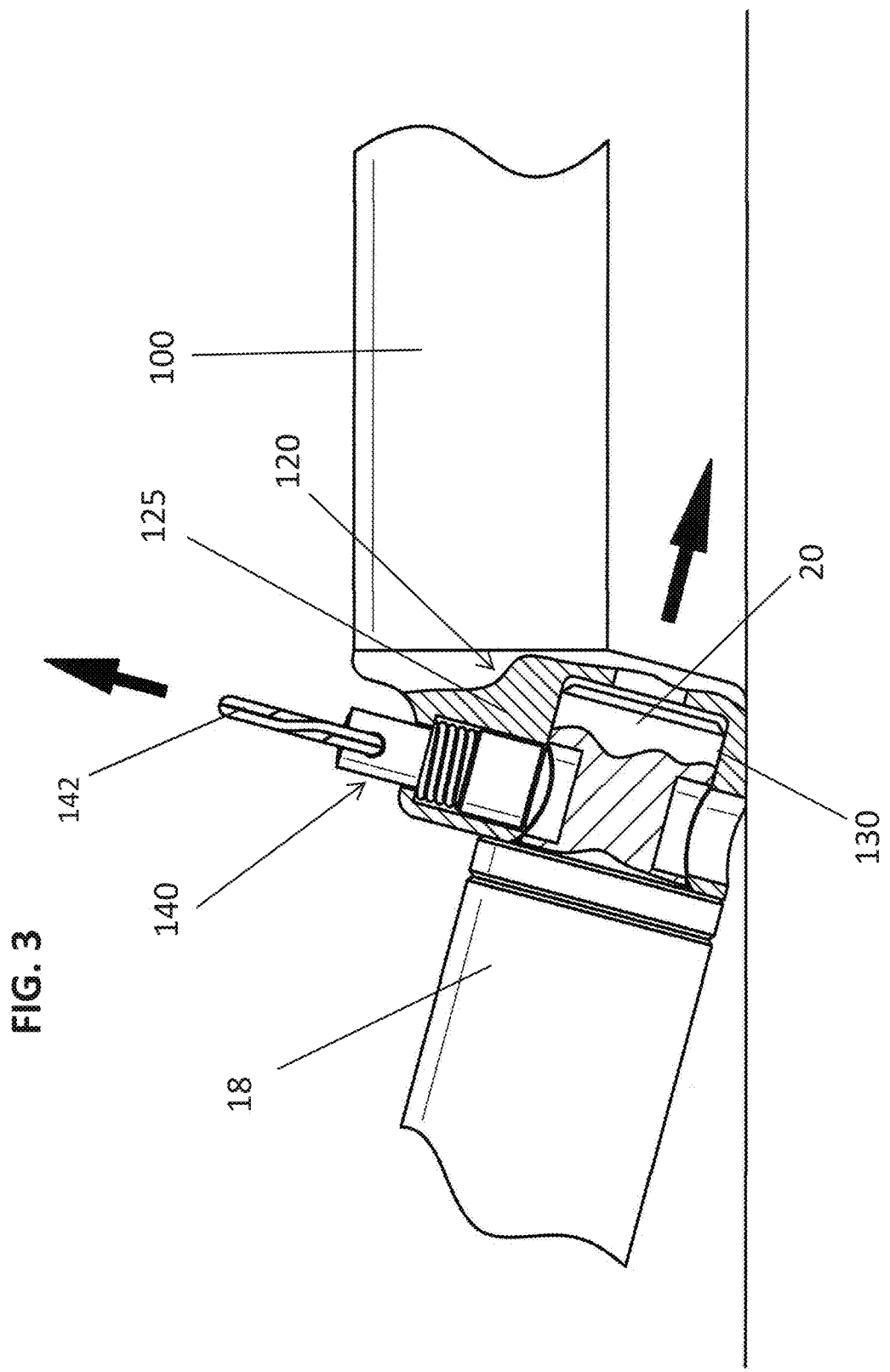
FIG. 3 is a cutaway view that illustrates how the invention attaches to the motorcycle stand when the locking pin is pulled away from the motorcycle stand handle.
Figure 4:
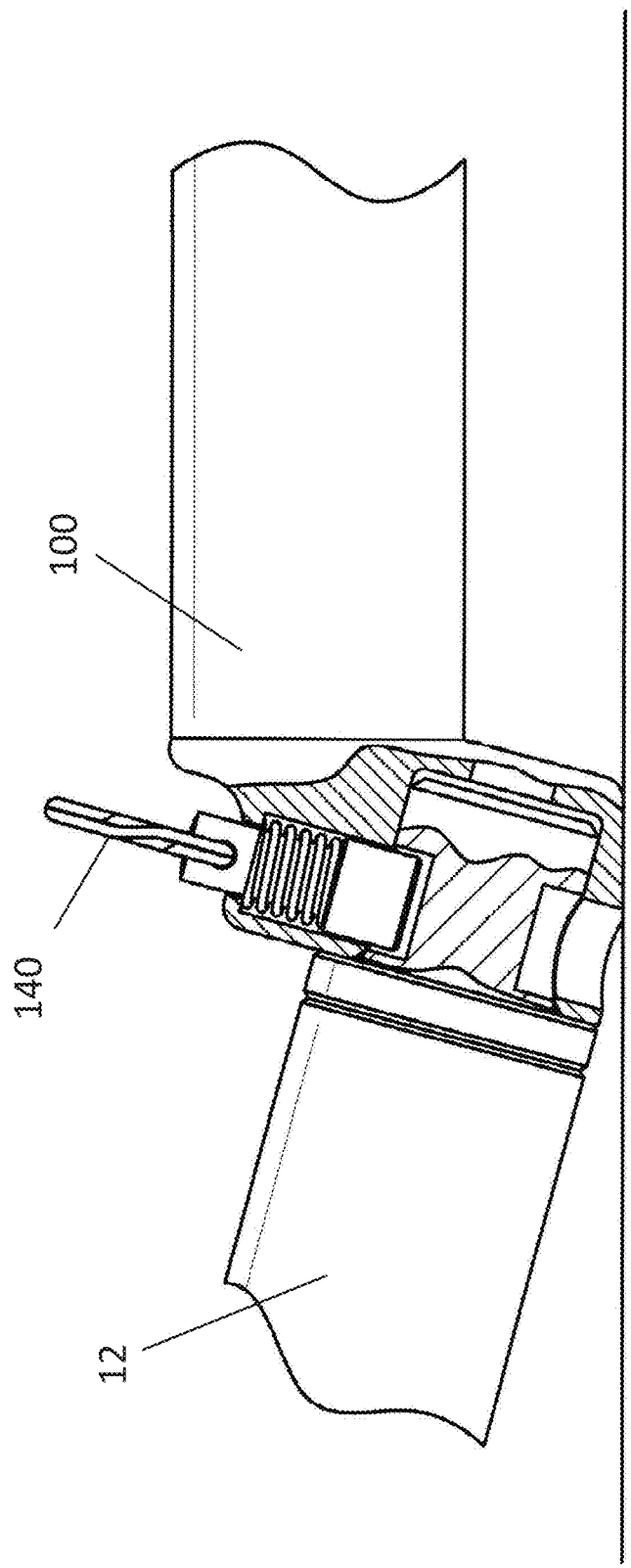
FIG. 4 is a cutaway view that illustrates how the invention attaches to the motorcycle stand when the locking pin is released and locked into the motorcycle stand handle.

The One-Armed Rear Stand 10 currently in production is capable of securely lifting the rear wheel off the ground and stabilizing it in the lifted position for maintenance such as wheel removal. The One-Armed Rear Stand 10 is designed specifically for motorcycles with a single sided swingarm as opposed to a more conventional swingarm that has structural support on each side of the rear wheel.

The One-Armed Rear Stand 10 includes a lateral support 11 having two ends. Each end having attached thereto a rotatable wheel. An upright tube 14 has one end secured to and extending from the lateral support 11, and the upright tube 14 having another end 16 configured to be attached to a wheel on the motorcycle. A handle 12 has one end 13 removably secured to the upright tube 14 and the handle 12 having another free end 18 distal to the upright tube, wherein when the stand 10 is secured to a motorcycle, the moving of the free end 18 lifts or lowers the motorcycle. In addition, a means 15 for removably attaching the handle 12 to the upright tube 14 in a first position defined as having the free end of the handle behind the motorcycle wheel and in a second position defined as having the free end of the handle in front of the motorcycle wheel. The means 15 for removably attaching the handle to the upright tube includes a male key extending from one of the handle or upright tube and a female mating key aperture positioned on the upright tube or handle and for receiving the male key and wherein the male key and female key aperture has two key positions such that the handle is configured to attach to the upright tube in at least the first and second positions As mentioned, the One-Armed Rear Stand 10 consists of the structural lateral support 14 for the motorcycle including a structural pin 16 that is inserted into the hollow rear axle of the motorcycle. Lifting of the motorcycle is done with an attached handle 12.

The handle 12 is situated perpendicular to the structural support as viewed from a side view of the motorcycle such that when the motorcycle is lifted, the handle rests at an angle of approximately 15 degrees with respect to the ground. When the motorcycle is lifted, the handle end 18 and end cap 20 rest on the ground to hold the motorcycle at a fixed level off the ground. The One-Armed Rear Stand handle 10 can be attached to allow the handle 12 to face forward with respect to the motorcycle or removed then re-attached at a 180 degree angle to allow the handle 12 to face rearward with respect to the motorcycle. Depending on the configuration of the motorcycle itself, the One-Armed Rear Stand 10 can face forward or rearward and on the left or right side of the motorcycle. These four possible combinations are illustrated in FIGS. 6, 7A, 7B, and 7C.

In most cases, the length of the handle 12 adequately provides enough leverage to lift the motorcycle off the ground. There are, however, instances where the motorcycle is too heavy relative to the weight and/or strength of the user. For these instances, a handle extension 100 is required to increase leverage.

Figure 5A:
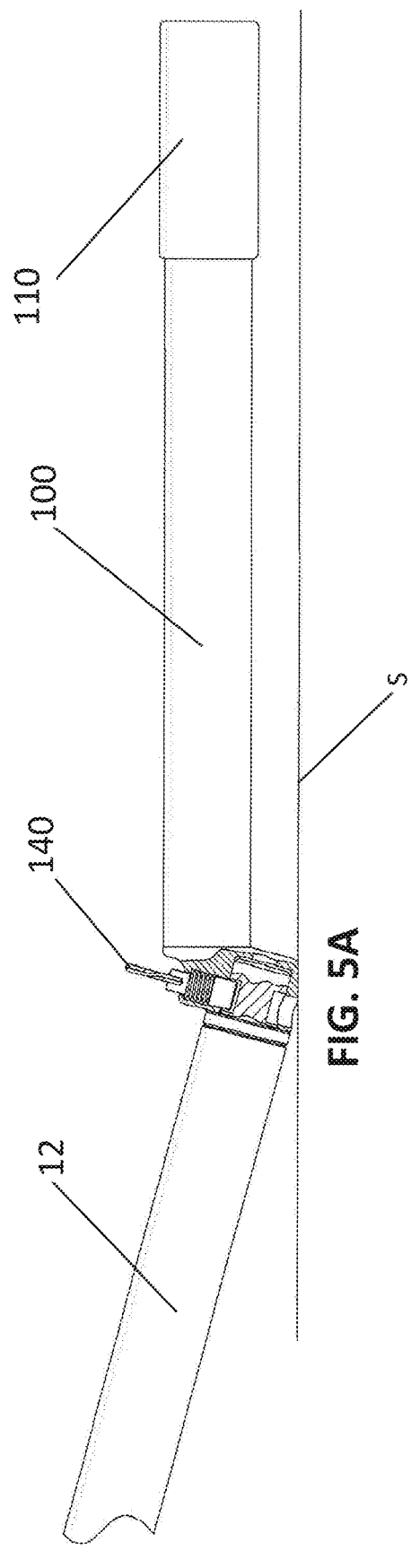
FIGS. 5A and 5B Illustrate how the invention is installed onto the motorcycle stand.
Figure 5B:
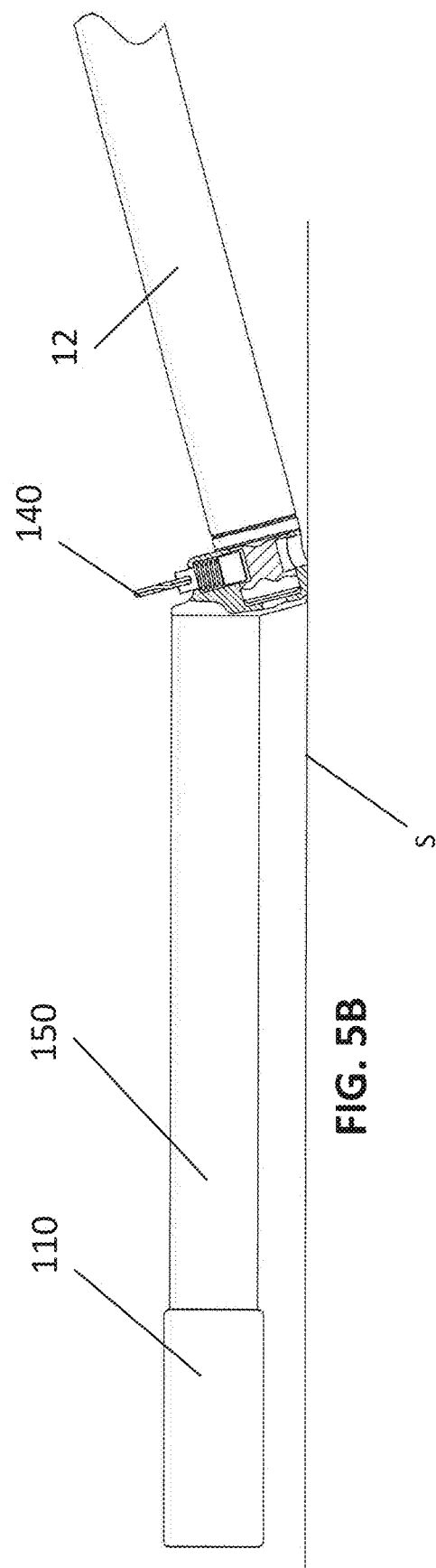
Figure 6:
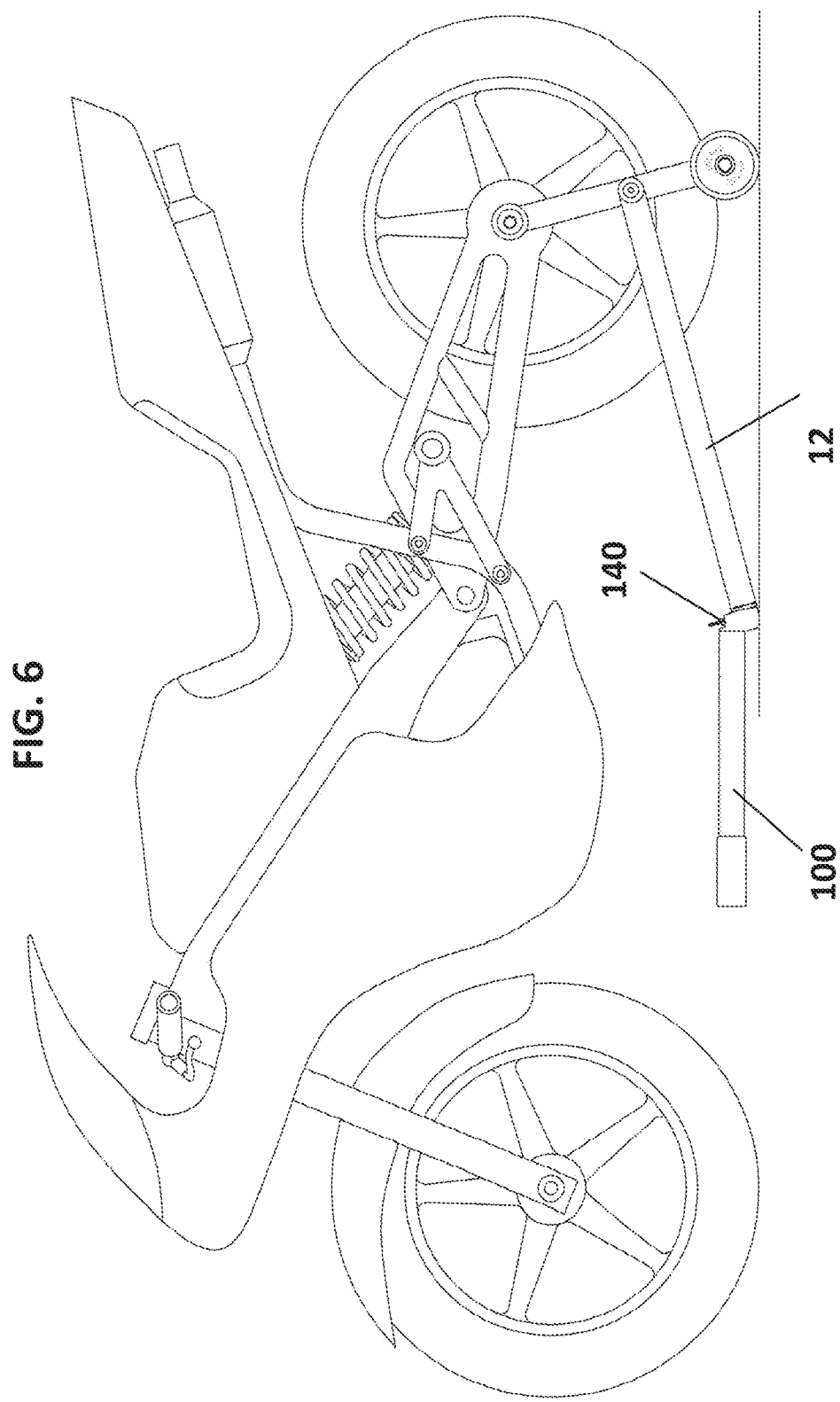
FIG. 6 Is an illustration of the invention in use in a common configuration with the motorcycle stand inserted into the left side of the motorcycle and the stand handle facing forward with respect to the motorcycle.
Figure 7A:
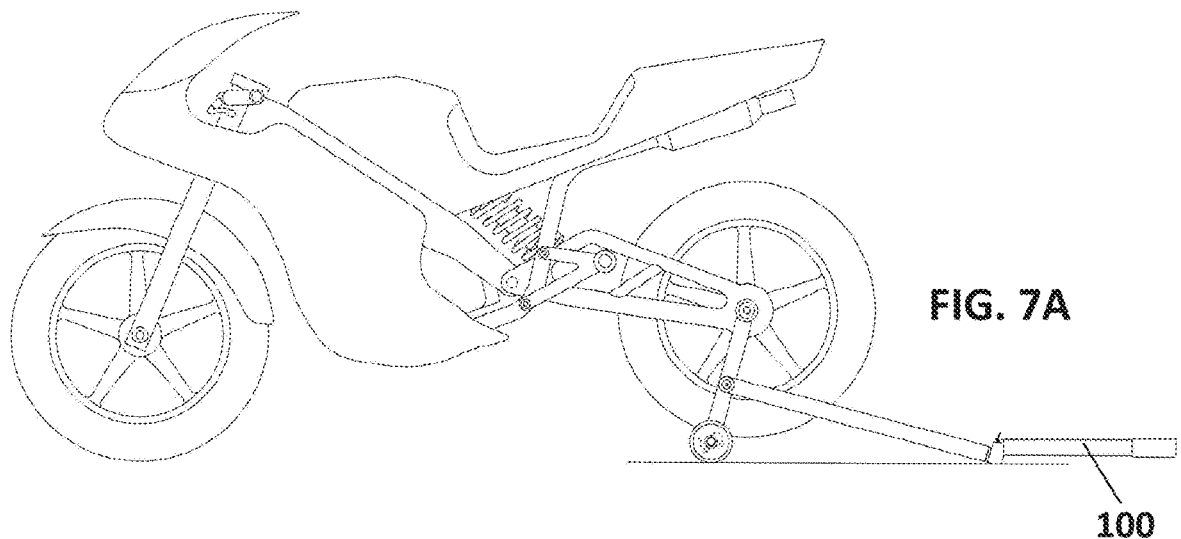
FIGS. 7a, 7b, 7c Illustrate three different orientations possible with the invention including: 7a the stand inserted into the left side of the motorcycle with the handle facing rearward; 7b the stand inserted into the right side of the motorcycle with the handle facing forward; and 7c the stand inserted into the right side of the motorcycle with the handle facing rearward.
Figure 7B:
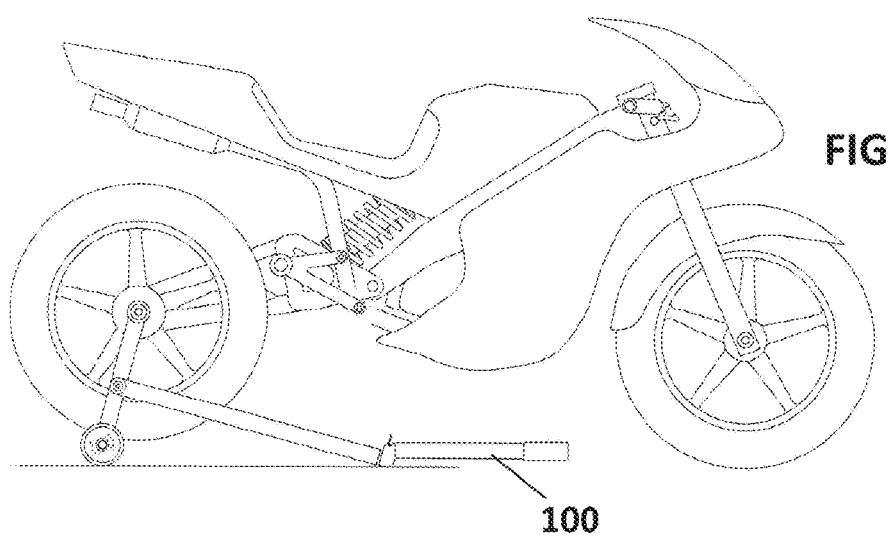
Figure 7C:
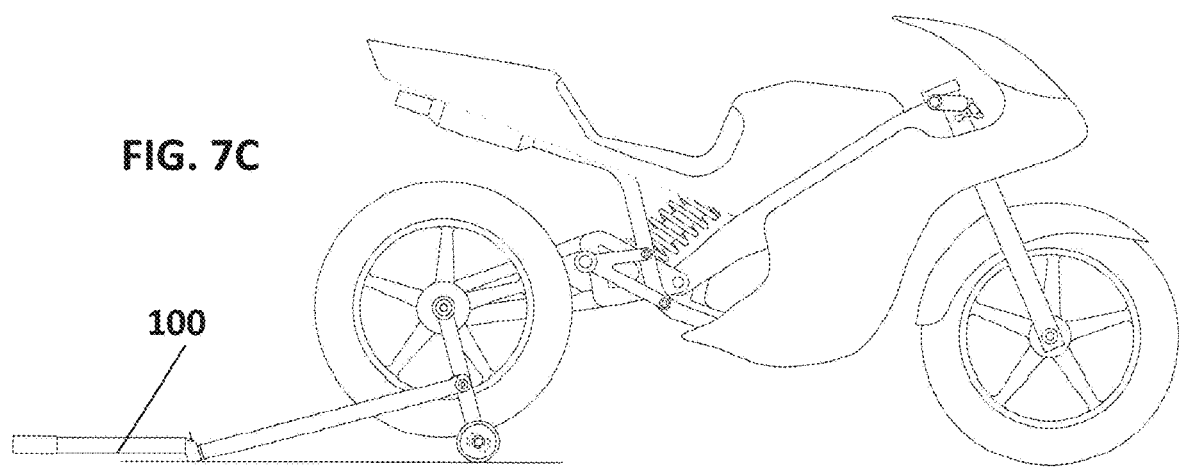
Figure 8:
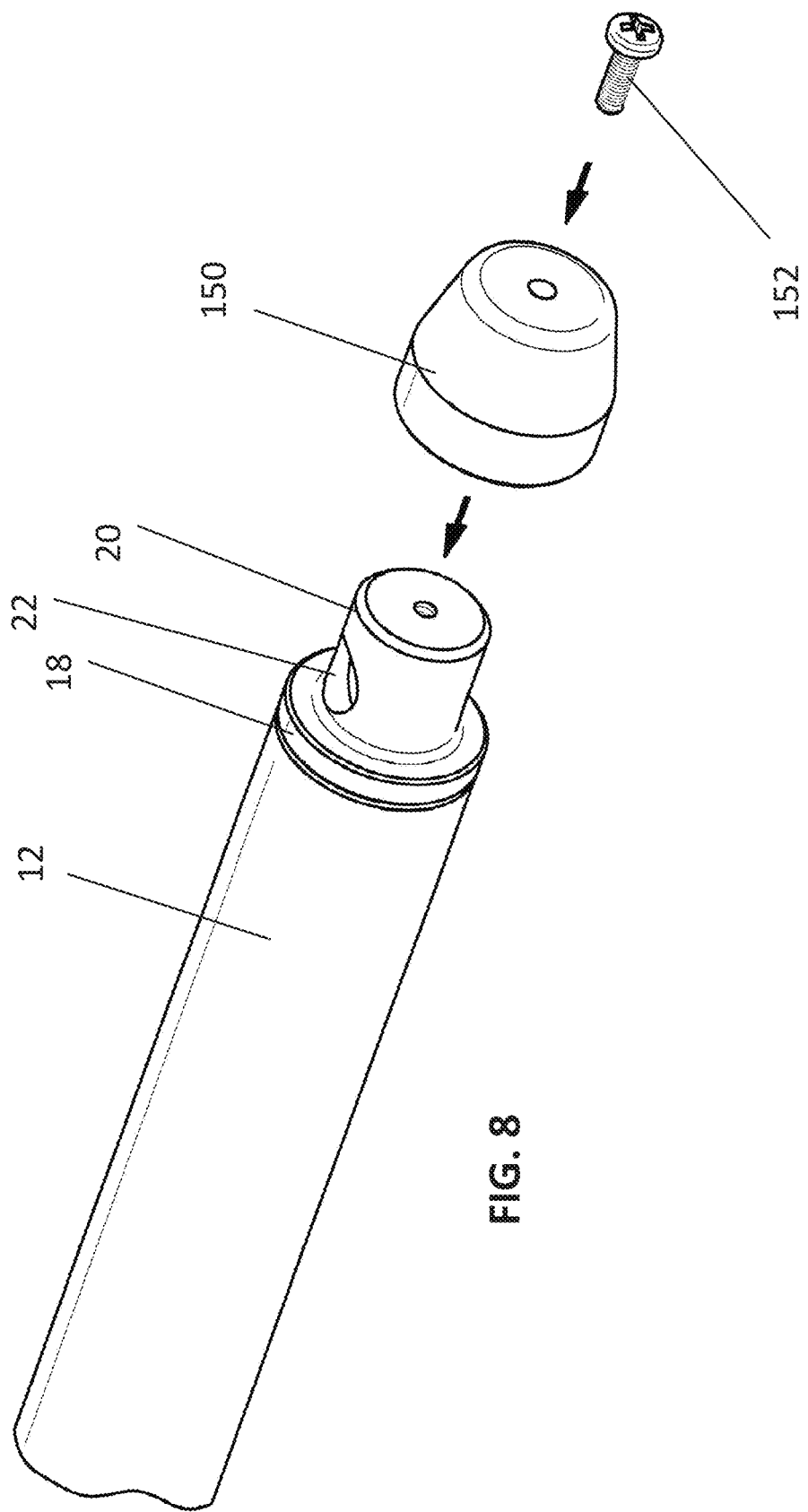
FIG. 8 Illustrates how a handle end cap is installed onto the motorcycle stand handle when the handle extension is not in use.

The invention, a handle extension 100 for the One-Armed Rear Stand, answers a unique challenge in that it installs onto the handle 12 that rests at a 15 degree angle with respect to the ground (S) whether the handle 12 is facing forward or rearward or on the left side or right side with respect to the motorcycle. Further, it changes the angle of the handle/extension combination such that when the motorcycle is in the lifted position, the handle extension rests horizontal with respect to the ground and off the ground such that the user's fingers are never trapped between the handle extension and the ground (illustrated in FIGS. 5A and 5B). Further, an elastomeric grip 110 at the end of the handle extension 100 provides comfort to the user when leveraging the motorcycle off the ground.

The handle extension 100 invention locks securely onto the handle 12. As part of the invention, the end 18 of the One-Armed Rear handle 10 is configured such that it has a cylindrical protruding member 20 outwardly extending from end 18. The handle extension 100 further includes a locking end 120 that slides onto and locks into the cylindrical protruding member 20. It also has two relatively shallow holes 22 configured 180 degrees apart, one facing upward and one facing downward. The handle extension 100 mates to the end 18 of the handle 10 by inserting the cylindrical protruding member 20 with a cylindrical hole 130 in a housing 125 that slides over the cylindrical shape protruding member 20 of the handle. It locks onto the handle by means of a shouldered, spring-loaded pin 140 that locks into one of the relatively shallow holes 22 at the handle end 18.

The shouldered, spring-loaded pin 140 has a pull ring 142 attached to the top of the shouldered pin 144 to retain the shouldered pin 144 and spring 146 in the cylindrical hole 130 of the handle extension 100. The force of the spring pushing against the shoulder of the pin to keep the pin penetrated into one of the holes 22 using shear force to keep the handle and extension mated. To remove the handle extension 100, the user pulls the pull ring against the force of the spring allowing the shouldered pin to be pulled out of the relatively shallow hole 22 and allowing the handle extension housing 125 to be pulled away from the end 18 of the handle 12. Alternatively, the pin can be pulled clear of the relatively shallow hole 22 and the handle extension can be rotated 180 degrees to change the orientation of the handle extension to accommodate the forward to rearward orientation of the handle itself.

If it is decided that a handle extension 100 is not required and as part of the invention, a cover or cap 150 can be installed over the handle end 18. The shape of the cap 150 is specific for making contact with the ground. The purpose of the cap 150 is to protect the tip of the handle and/or ground surface and to cosmetically complete the look of the handle. It can be a non-metallic material to sacrificially abrade if the motorcycle/stand ensemble is moved across a surface such as concrete or asphalt. It is held in place by a screw 152 that penetrates it and mates with a threaded hole in the handle end.

I claim:

1. A motorcycle stand comprising:
    a lateral support having two ends, each end having attached thereto a rotatable wheel;
    an upright tube having one end secured to and extending from the lateral support, and the upright tube having another end configured to be attached to a wheel on the motorcycle;
    a first handle having one end removably secured to the upright tube and the first handle having a second end distal to the upright tube, wherein when the stand is secured to the motorcycle, wherein the moving of the second end lifts or lowers the motorcycle;
    a mechanical attachment for removably attaching the first handle to the upright tube in a first position defined as having the second end of the first handle behind the motorcycle wheel and in a second position defined as having the second end of the first handle in front of the motorcycle wheel; and
    a handle extension member having a first locking end removably attached to the second end of the first handle, the handle extension member further having an end grip cap distal to the first locking end, and wherein when the end grip cap is moved upwardly, the handle extension member is configured to provide additional leverage in lifting the motorcycle than when moving the first handle, and
    wherein the mechanical attachment removably secures the first handle to the upright tube at an angle that is perpendicular to the upright tube and about 15 degrees with respect to a ground surface such that the second end of the first handle is adjacently resting against the ground surface;
    wherein the handle extension member is removably attached to the second end of the first handle via a shouldered spring-loaded pin;
    wherein the second end of the first handle further includes an end tip having at least one opening, and the first locking end of the handle extension member includes a lateral channel sized to house the shouldered spring-loaded pin and includes an aperture perpendicular to the lateral channel and positioned along the longitudinal axis of the handle extension, wherein when the shouldered spring-loaded pin is pulled the end tip of the second end is received into/removable from the aperture and when the shouldered spring-loaded pin is released the shouldered spring-loaded pin locks into the at least one opening of the end tip of the second end thereby locking the first handle to the first locking end of the handle extension; and
    wherein the first locking end of the handle extension member is positioned at an angle from a body length of the handle extension member such that the end grip cap of the handle extension member is resting away from the ground surface;
    wherein the shouldered spring-loaded pin has a pull ring attached to the top of the shouldered spring-loaded pin and accessible externally to the handle extension member.

2. The motorcycle stand of claim 1, wherein the end tip of the second end of the first handle includes two openings that are 180° from each other, wherein when pull ring is pulled the handle extension member can be rotated 180° to change an orientation of the handle extension.

3. The motorcycle stand of claim 2 further comprising a cover cap removably secured over the end tip of the first handle when the handle extension member is removed from the first handle, the cover cap being configured to protect the end tip when making contact with the ground surface.

4. A motorcycle stand comprising:
    a lateral support having two ends, each end having attached thereto a rotatable wheel;
    an upright tube having one end secured to and extending from the lateral support, and the upright tube having another end configured to be attached to a wheel on the motorcycle;
    a first handle having one end removably secured to the upright tube and the first handle having a second end distal to the upright tube, wherein when the stand is secured to the motorcycle, wherein the moving of the second end lifts or lowers the motorcycle;
    a mechanical attachment for removably attaching the first handle to the upright tube in a first position defined as having the second end of the first handle behind the motorcycle wheel and in a second position defined as having the second end of the first handle in front of the motorcycle wheel; and a handle extension member having a first locking end removably attached to the second end of the first handle, the handle extension further having an end grip cap distal to the first locking end, and wherein when the end grip cap is moved upwardly, the handle extension is configured to provide additional leverage in lifting the motorcycle than when moving the first handle, and wherein the first locking end of the handle extension member is angled from the handle extension member such that the end grip cap of the handle extension is resting away from a ground surface; and wherein the mechanical attachment removably secures the first handle to the upright tube at an angle that is perpendicular to the upright tube and about 15 degrees with respect to a ground surface such that the second end of the first handle is adjacently resting against the ground surface;

wherein the handle extension member is removably attached to the second end of the first handle via a shouldered spring-loaded pin;

wherein the second end of the first handle further includes an end tip having at least one opening, and the first locking end of the handle extension member includes a lateral channel sized to house the shouldered spring-loaded pin and includes an aperture perpendicular to the lateral channel and positioned along the longitudinal axis of the handle extension member, wherein when the shouldered spring-loaded pin is pulled the end tip of the second end is received into/removable from the aperture and when the shoulder spring-loaded pin is released the shouldered spring-loaded pin locks into the at least one opening of the end tip of the second end thereby locking the first handle to the first locking end of the handle extension member; and wherein the shouldered spring-loaded pin has a pull ring attached to the top of the shouldered spring-loaded pin and accessible externally to the handle extension member.

5. The motorcycle stand of claim 4, wherein the end tip of the second end of the first handle includes two openings that are 180° from each other, wherein when pull ring is pulled the handle extension member can be rotated 180° to change an orientation of the handle extension member.

6. The motorcycle stand of claim 5 further comprising a cover cap removably secured over the end tip of the first handle when the handle extension member is removed from the first handle, the cover cap being configured to protect the end tip when making contact with the ground surface.

7. A motorcycle stand comprising:
a lateral support having two ends;
an upright tube having one end secured to and extending from the lateral support, and the upright tube having another end configured to be attached to a wheel on the motorcycle;

a first handle having one end removably secured to the upright tube and the first handle having a second end distal to the upright tube, wherein when the stand is secured to the motorcycle, wherein the moving of the second end lifts or lowers the motorcycle;

a mechanical attachment for removably attaching the first handle to the upright tube in a first position defined as having the second end of the first handle behind the motorcycle wheel and in a second position defined as having the second end of the first handle in front of the motorcycle wheel, wherein the mechanical attachment removably secures the first handle to the upright tube at an angle that is perpendicular to the upright tube and about 15 degrees with respect to a ground surface such that the second end of the first handle is adjacently resting against the ground surface; and a handle extension member having a first locking end removably attached to the second end of the first handle, the handle extension member further having an end grip cap distal to the first locking end, and wherein when the end grip cap is moved upwardly, the handle extension member is configured to provide additional leverage in lifting the motorcycle than when moving the first handle, and wherein the first locking end of the handle extension member is angled from the handle extension member such that the end grip cap of the handle extension is resting away from the ground surface; and wherein the handle extension is removably attached to the second end of the first handle via a shouldered spring-loaded pin;

wherein the second end of the first handle further includes an end tip having a pair of openings positioned 180° from each other, and the first locking end of the handle extension includes a lateral channel sized to house the shouldered spring-loaded pin and includes an aperture perpendicular to the lateral channel and positioned along the longitudinal axis of the handle extension member, wherein when the shouldered spring-loaded pin is pulled, the end tip of the second end is received into/removable from the aperture and when the shouldered spring-loaded pin is released, the shouldered spring-loaded pin locks into the pair of openings on the end tip of the second end thereby locking the first handle to the first locking end of the handle extension member;

wherein the shouldered spring-loaded pin has a pull ring attached to the top of the shouldered spring-loaded pin and accessible externally to the handle extension member wherein when the pull ring is pulled the handle extension can be rotated 180° to change an orientation of the handle extension member.

8. The motorcycle stand of claim 7 further comprising a cover cap removably secured over the end tip of the first handle when the handle extension member is removed from the first handle, the cover cap being configured to protect the end tip when making contact with a ground surface.

* * * * *